United States Patent Office 3,475,403
Patented Oct. 28, 1969

3,475,403
ASPARTIC ACID CONTAINING DIPEPTIDE
LOWER ALKYL ESTERS
Robert H. Mazur, Deerfield, Arthur H. Goldkamp,
Winnetka, and James M. Schlatter, Glenview, Ill.,
assignors to G. D. Searle & Co., Chicago, Ill., a
corporation of Delaware
No Drawing. Filed Jan. 20, 1967, Ser. No. 610,465
Int. Cl. C07g 7/00; A23j 3/00
U.S. Cl. 260—112.5  12 Claims

ABSTRACT OF THE DISCLOSURE

Aspartic acid containing dipeptide lower alkyl esters possessing sweetening properties and preparable by the coupling of a protected apartic acid derivative with the appropriate amino acid ester followed by removal of the protecting groups.

---

The present invention is concerned with novel and useful dipeptide derivatives and, more particularly, with aspartic acid containing dipeptide lower alkyl esters as represented by the following structural formula $$\text{H}_2\text{N}-\underset{\underset{\underset{\text{COOH}}{|}}{\overset{|}{\text{CH}_2}}}{\overset{|}{\text{CH}}}-\text{CONH}-\underset{\overset{|}{\text{X}}}{\overset{|}{\text{CH}}}-\text{COO(lower alkyl)}$$

wherein X is one of the following radicals

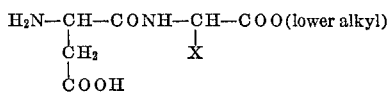

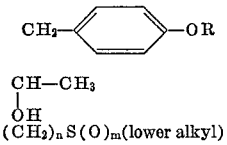
$(\text{CH}_2)_n \text{S}(\text{O})_m (\text{lower alkyl})$

R being hydrogen or a lower alkyl radical, $m$ being an integer selected from the group consisting of 0 and 2, and $n$ being a positive integer less than 3.

The lower alkyl radicals symbolized in the foregoing structural formular are typified by methyl, ethyl, propyl, butyl, pentyl, hexyl, heptyl and the branched-chain radicals thereof.

The novel compounds of the present invention are conveniently produced by first contacting a suitable aspartic acid derivative, wherein protecting groups have been attached to the amino and β-carboxy groups and the α-carboxy group has been converted to a reactive ester function, with the appropriate amino acid ester. The protecting groups are then removed by suitable means from the aspartic acid portion of the resulting intermediate product. When the amino group is protected by a benzyloxycarbonyl function and the β-carboxy group by a benzyl ester moiety, catalytic hydrogenation is a preferred method for effecting removal. Those processes are specifically illustrated by the reaction of N-benzyloxycarbonyl-L-aspartic acid α-p-nitrophenyl, β-benzyl diester (described by S. Guttmann, Helv. Chim. Acta, 44, 721 (1961)) with L-tyrosine methyl ester to yield β-benzyl N-benzyloxycarbonyl-L-aspartyl-L-tyrosine methyl ester, which is hydrogenolyzed in aqueous acetic acid, utilizing palladium black catalyst, to afford L-aspartyl-L-tyrosine methyl ester.

The instant dipeptides characterized by a sulfone group are obtained by reaction of the protected aspartic acid derivative with the appropriate amino acid ester containing the sulfone group. The latter substances are conveniently produced by esterification of the corresponding amino acid sulfones. For example, L-methionine sulfone is converted to its methyl ester hydrochloride by reaction with a solution of thionyl chloride in methanol and the free ester is allowed to react with the aforementioned N - benzyloxycarbonyl - L - aspartic acid α-p-nitrophenyl β-benzyl diester to yield β-benzyl N-benzyloxycarbonyl-L-aspartyl-L-methionine methyl ester sulfone, which is hydrogenolyzed with palladium to afford L-aspartyl-L-methionine methyl ester sulfone.

The dipeptide derivatives of the present invention share the surprising and completely unexpected property of possessing a sweet taste. This property is useful as a result of the ability of those derivatives to impart their sweetness to a variety of food products. Examples of such food products are fruits, vegetables, juices, meat products such as ham or bacon, sweetened milk products, egg products, salad dressings, ice creams and sherbets, gelatins, icings, syrups, cake mixes and beverages such a carbonated soft drinks and wines.

An example of a typical sweetened orange soda is shown by the following preparation:

A stock supply of bottler's syrup is prepared by mixing 5.5 ml. of a 50% aqueous citric acid solution with 150 ml. of water, dissolving 2 g. of L-aspartyl-L-tyrosine methyl ester in that solution, adding successively 7.02 ml. of the orange flavor base manufactured by the A. E. Illes Company, Dallas, Tex., labeled FO–78 and 2.7 g. of sodium benzoate and diluting that mixture to 200 ml. with water. One oz. samples of that bottler's syrup are transferred to 6 oz. bottles and 110 ml. of cold tap water is added to each bottle. To each bottle 42 ml. of cold charged bottling water (5 volumes carbon dioxide) is then added to achieve carbonation. Each bottle is capped and the contents mixed.

Comparison of the latter samples with orange soda containing a quantity of sucrose 50 times that of the named dipeptide derivative reveals no detectable difference in sweetness.

The instant dipeptide sweetening agents are water soluble, stable substances which can be utilized in a variety of physical forms, e.g. as powders, tablets, syrups etc. Liquid or solid carriers such as water, glycerol, starch, sorbitol, salt, citric acid and other suitable non-toxic substances can be used also.

It has been determined that the property of sweetness is affected by the stereochemistry of the individual amino acid units comprising the dipeptide structure. The L—L isomers, for example, L-aspartyl-L-tyrosine methyl ester, are especially sweet. It is thus apparent that mixtures containing the L—L isomers, i.e. DL—DL, L–DL or DL–L share that property also.

The sweetening agents of the present invention are particularly useful to diabetics as substitutes for sugar. They are, moreover, lacking in the unpleasant after taste exhibited by such synthetic sweeteners as saccharin and cyclamate. The absence of toxic properties results from their derivation from natural sources, i.e. the naturally occurring amino acids utilized by the animal body in the manufacture of essential proteins.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.) and quantities of materials are expressed in parts by weight except where otherwise noted. The double melting points observed in the case of the dipeptide esters result from heat-catalyzed cyclization of those substances to afford the corresponding diketopiperazines.

EXAMPLE 1

A mixture containing 10.05 parts of N-benzyloxycarbonyl-L-aspartic acid α-p-nitrophenyl, β-benzyl diester, L-tyrosine methyl ester and 45 parts of ethyl acetate is stored at about 65° for approximately 24 hours, then is cooled and washed successively with 50% aqueous potassium carbonate, water, dilute hydrochloric acid and water. Drying of that solution over magnesium sulfate followed by distillation of the solvent under reduced pressure affords a gummy residue, which is purified by crystallization from ether-ethyl acetate to afford β-benzyl N - benzyloxycarbonyl - L-aspartyl-L-tyrosine methyl ester, melting at about 125–127.5° and exhibiting an optical rotation, in methanol, of −5°.

EXAMPLE 2

To a solution of 20 parts of β benzyl-N-benzyloxycarbonyl-L-aspartyl-L-tyrosine methyl ester in 250 parts of 75% aqueous acetic acid is added 2 parts of palladium black and the resulting mixture is shaken with hydrogen at atmospheric pressure and room temperature until the uptake of hydrogen ceases. The catalyst is removed by filtration and the filtrate is concentrated to dryness under reduced pressure. The resulting residue is crystallized from aqueous ethanol to afford L-aspartyl-L-tyrosine methyl ester, which exhibits a double melting point at about 180–185° and 230–235° with decomposition. This compound displays an optical rotation, in water, of +4° and is represented by the following structural formula

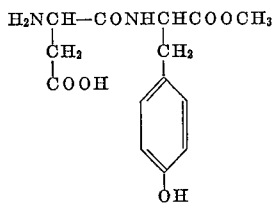

EXAMPLE 3

The substitution of 4.62 parts of L-tyrosine ethyl ester in the procedure of Example 1 followed by recrystallization of the crude product from etherisopropyl acetate affords β - benzyl N - benzyloxycarbonyl-L-aspartyl-L-tyrosine ethyl ester, melting at about 122–124° and exhibiting an optical rotation, in methanol, of −9°.

EXAMPLE 4

When 5 parts of β-benzyl N-benzyloxycarbonal-L-aspartyl-L-tyrosine ethyl ester is substituted in the procedure of Example 2, there is produced L-aspartyl-L-tyrosine ethyl ester, exhibiting a melting point of 188–190° with effervescence and an optical rotation, in water, of +6°. This compound is represented by the following structural formula

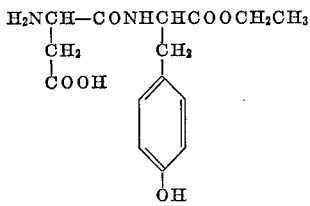

EXAMPLE 5

To a solution of 5.73 parts of O-methyltyrosine methyl ester hydrochloride in 50 parts of water is added sufficient potassium bicarbonate to effect neutralization, and the resulting aqueous mixture is extracted with ethyl acetate. The organic layer is separated, washed with water and dried over anhydrous magnesium sulfate.

When the latter organic solution is substituted for L-tyrosine methyl ester in the procedure of Example 1, there is produced β - benzyl N-benzyloxycarbonyl-L-aspartyl-L-O-methyltyrosine methyl ester, which, after recrystallization from ether-ethyl acetate, melts at about 114–115° and exhibits an optical rotation in methanol, of −4.5°.

EXAMPLE 6

By substituting 5 parts of β-benzyl N-benzyloxycarbonyl-L-aspartyl-L-O-methyltyrosine methyl ester in the procedure of Example 2 there is produced L-aspartyl-L-O-methyltyrosine methyl ester, which exhibits a double melting point at about 138–140° and 185–235° with decomposition. This compound possesses an optical rotation of −0.5° and is represented by the following structural formula

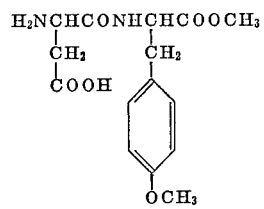

EXAMPLE 7

When 7.65 parts of L-O-ethyltyrosine methyl ester hydrochloride is substituted in the procedure of Example 5, there is produced β-benzyl N-benzyloxycarbonyl-L-aspartyl-L-O-ethyltyrosine methyl ester, melting at about 115–116° and displaying an optical rotation, in methanol, of −6°.

EXAMPLE 8

The hydrogenolysis of 5 parts of β-benzyl N-benzyloxycarbonyl-L-aspartyl-L-O-ethyltyrosine methyl ester by the procedure described in Example 2 results in L-aspartyl-L-O-ethyltyrosine methyl ester, exhibiting a melting point at about 185–240° with decomposition. It displays an optical rotation, in methanol, of −1.5°. This compound is represented by the following structural formula

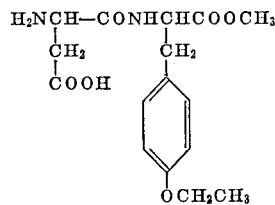

EXAMPLE 9

To a mixture containing 6 parts of L-methionine methyl ester hydrochloride, 15.3 parts of N-benzyloxycarbonyl-L-aspartic acid α-p-nitrophenyl, β-benzyl diester and 38 parts of dimethylformamide is added, with cooling and stirring 3.3 parts of triethylamine. Stirring is continued for about 2 hours; the mixture is stored at about 8° for approximately 16 hours and stirring is continued at room temperature for 3–4 hours. The mixture is then diluted with ethyl acetate and washed successively with dilute hydrochloric acid, dilute aqueous potassium carbonate and water. Those aqueous washings are extracted with ethyl acetate and the organic extracts are combined with the original organic solution. Those combined solutions are filtered through sodium sulfate and the solvent is allowed to evaporate at room temperature. The resulting residue is purified by recrystallization from isopropyl alcohol followed by washing with ether and drying in air to yield β-benzyl N-benzyloxycarbonyl-L-aspartyl-L-methionine methyl ester, melting at about 78–78.5° and exhibiting an optical rotation, in chloroform, of +26.5°.

EXAMPLE 10

To a solution of 10 parts of β-benzyl N-benzyloxycarbonyl-L-aspartyl-L-methionine methyl ester in 120 parts by volume of 75% aqueous acetic acid is added 3 parts of palladium black catalyst, and the resulting mixture is shaken with hydrogen at atmospheric pressure and room temperature until the uptake of gas ceases. Separation of the catalyst by filtration followed by distillation of the solvent under reduced pressure affords the residual crude product, which is purified first by trituration with ether, then by recrystallization from methanol-ether to afford pure L-aspartyl-L-methionine methyl ester, which exhibits a triple melting point at about 111°, 136.5–145° with decomposition and 200–213.5°. This compound displays an optical rotation, in water, of −19.5° and is represented by the following structural formula

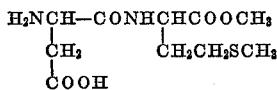

EXAMPLE 11

To a mixture containing 5.1 parts of L-threonine methyl ester hydrochloride, 15.1 parts of N-benzyloxycarbonyl-L-aspartic acid α-p-nitrophenyl, β-benzyl diester and 38 parts of dimethylformamide is added, with cooling, 3.3 parts of triethylamine, and the resulting reaction mixture is stirred for about 1 hour, then is allowed to stand at room temperature for about 16 hours. At this point 0.5 part of imidazole is added and the reaction mixture is stirred for about 1 hour, then is diluted with ethyl acetate and washed successively with dilute hydrochloric acid, dilute aqueous potassium bicarbonate and dilute aqueous sodium sulfate. That organic solution is dried over anhydrous sodium sulfate and the solvent is allowed to evaporate at room temperature, thus resulting in β-benzyl N-benzyloxycarbonyl-L-aspartyl-L-threonine methyl ester.

EXAMPLE 12

To a solution of 11 parts of β-benzyl N-benzyloxycarbonyl-L-aspartyl-L-threonine methyl ester in 200 parts by volume of 75% aqueous acetic acid is added 1 part of palladium black catalyst and that mixture is shaken with hydrogen at atmospheric pressure and room temperature until the uptake of hydrogen is complete. The catalyst is removed by filtration and the filtrate is concentrated to dryness under reduced pressure. The residue is dissolved in aqueous methanol and the crude product is precipitated by the addition of ether. Purification of that precipitated crude product is effected by recrystallization from aqueous isopropyl alcohol to yield pure L-aspartyl-L-threonine methyl ester, melting at about 159.5–160.5° with decomposition. It displays an optical rotation, in water, of −6° and is represented by the following structural formula

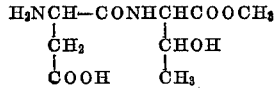

EXAMPLE 13

A mixture containing 7.45 parts of L-S-methylcysteine methyl ester hydrochloride, 20.1 parts of N-benzyloxycarbonyl-L-aspartic acid α-p-nitrophenyl, β-benzyl diester and 47.5 parts of dimethylformamide is stirred, then cooled while 4.3 parts of triethylamine is added dropwise. Stirring at room temperature is continued for about 1½ hours, at the end of which time the mixture is stored for about 20 hours. Approximately 0.5 part of imidazole is added and the mixture is stirred for about 1 hour, then is diluted with ethyl acetate. The resulting organic solution is washed successively with dilute hydrochloric acid, dilute aqueous potassium carbonate and dilute aqueous sodium sulfate. The washed solution is dried over anhydrous sodium sulfate, then is stripped of solvent by distillation under reduced pressure to afford the residual crude product which, after recrystallization from ether, affords pure β-benzyl N-benzyloxycarbonyl-L-aspartyl-L-S-methylcysteine methyl ester displaying a double melting point at about 55–62° and 76–82°. This compound possesses an optical rotation, in chloroform, of +15.5°.

EXAMPLE 14

A mixture containing 7.3 parts of β-benzyl N-benzyloxycarbonyl-L-aspartyl-L-S-methylcysteine methyl ester, 120 parts by volume of 75% aqueous acetic acid and 1.4 parts of palladium black catalyst is shaken with hydrogen at atmospheric pressure and room temperature until the uptake of hydrogen ceases, at which time the catalyst is removed by filtration and the solvent is distilled under reduced pressure. The resulting residual crude product is triturated with ether, then is further purified by recrystallization from methanol-isopropyl alcohol and washing with ether to yield pure L-aspartyl-L-S-methylcysteine methyl ester, which exhibits a melting point at about 146.5–149° with decomposition and displays an optical rotation, in water, of −26°. This compound is represented by the following structural formula

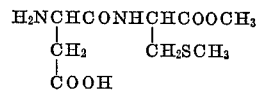

EXAMPLE 15

When an equivalent quantity of L-S-ethylcysteine methyl ester hydrochloride is substituted in the procedure of Example 13, there is produced β-benzyl N-benzyloxycarbonyl-L-aspartyl-L-S-ethylcysteine methyl ester.

EXAMPLE 16

The substitution of an equivalent quantity of β-benzyl N-benzyloxycarbonyl-L-aspartyl-L-S-ethylcysteine methyl ester in the procedure of Example 14 results in L-aspartyl-L-S-ethylcysteine methyl ester.

EXAMPLE 17

To 40 parts of cold methanol is added dropwise 4.9 parts of thionyl chloride, and 6 parts of L-methionine sulfone is added to the latter solution. The resulting reaction mixture is stirred at the reflux temperature for 2½ hours, then is cooled and stored at room temperature for about 16 hours. Decolorization of the solution with activated carbon followed by dilution with ether results in precipitation of the product, which is collected by filtration and washed with ether to yield L-methionine sulfone methyl ester hydrochloride, melting at about 164–167° with decomposition and exhibiting an optical rotation, in water, of +25°.

EXAMPLE 18

A mixture of 4.65 parts of L-methionine sulfone methyl ester hydrochloride, 10.05 parts of N-benzyloxycarbonyl-L-aspartic acid α-p-nitrophenyl, β-benzyl diester and 23.8 parts of dimethylformamide is stirred while 2.15 parts of triethylamine is added dropwise. Stirring at room temperature is continued for about 1½ hours longer, following which time the mixture is stored at room temperature for about 16 hours. At the end of that time, ethyl acetate is added and the resulting organic solution is washed successively with dilute hydrochloric acid, dilute aqueous potassium carbonate and dilute aqueous sodium acetate. Those aqueous washings are extracted with ethyl acetate and the combined organic solutions are dried over anhydrous sodium sulfate, then allowed to stand in order to permit the solvent to evaporate. The resulting residual crude product is purified by recrystallization from isopropyl alcohol to afford pure β-benzyl N-benzyloxycarbonyl-L-aspartyl-L-methionine sulfone methyl ester, melting at about 84–112°. This compound exhibits an optical rotation, in chloroform, of +30°.

EXAMPLE 19

To a solution of 5.35 parts of β-benzyl N-benzyloxycarbonyl-L-aspartyl-L-methionine sulfone methyl ester in 150 parts by volume of 75% aqueous acetic acid is added 0.5 part of palladium black catalyst and the resulting mixture is shaken with hydrogen at room temperature and atmospheric pressure until cessation of hydrogen uptake. Removal of the catalyst by filtration and the solvent by distillation under reduced pressure affords the crude product which is triturated with ether, then further purified by recrystallization from methanol-isopropyl alcohol to yield L-aspartyl-L-methionine sulfone methyl ester exhibiting a melting point at about 155.5–156° with decomposition and an optical rotation, in water, of −2°. It is represented by the following structural formula

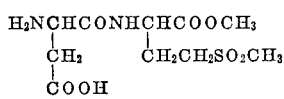

EXAMPLE 20

To 40 parts of methanol is added dropwise 5.74 parts of thionyl chloride, following which time 4.24 parts of L-S-methylcysteine sulfone is added. The resulting reaction mixture is heated at the reflux temperature for about 2 hours, then is cooled and decolorized with activated carbon. Dilution of that solution with ether affords L-S-methylcysteine sulfone methyl ester hydrochloride, melting at about 168–170° with decomposition and displaying an optical rotation, in water, of +6°.

EXAMPLE 21

To a solution of 4.35 parts of L-S-methylcysteine sulfone methyl ester hydrochloride and 10.05 parts of N-benzyloxycarbonyl - L - aspartic acid α-p-nitrophenyl, β-benzyl diester in 23.8 parts of dimethylformamide is added, with stirring and cooling, 2.15 parts of triethylamine. Stirring at room temperature is continued for about 2 hours, following which time the mixture is stored for about 16 hours. Dilution with ethyl acetate followed by successive washing with dilute hydrochloric acid, dilute aqueous potassium carbonate and dilute aqueous sodium sulfate results in the organic solution, which is combined with ethyl acetate extracts of those aqueous washings. The combined ethyl acetate solution is dried over anhydrous sodium sulfate and stripped of solvent by distillation under reduced pressure. The resulting residue is crystallized from isopropyl alcohol, then washed with cyclohexane and pentane to afford β-benzyl N-benzyloxycarbonyl-L-aspartyl-L-S-methylcysteine sulfone methyl ester, melting at about 96–98°. It exhibits an optical rotation, in chloroform, of +14°.

EXAMPLE 22

To a solution of 7.03 parts of β-benzyl-N-benzyloxycarbonyl-L-aspartyl-L-S-methylcysteine sulfone methyl ester in 150 parts by volume of 75% aqueous acetic acid is added 0.7 part of palladium black catalyst and the resulting reaction mixture is shaken with hydrogen at atmospheric pressure and room temperature until hydrogen is no longer absorbed. The catalyst is removed by filtration and the solvent is distilled under reduced pressure to yield the crude residual product. Trituration with ether affords a gummy solid, which is purified by crystallization from aqueous isopropyl alcohol to yield L-aspartyl-L-S-methylcysteine sulfone methyl ester, melting at about 135–136° with decomposition and displaying an optical rotation, in water, of −9°. It is represented by the following structural formula

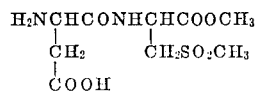

What is claimed is:

1. An aspartyl dipeptide lower alkyl ester of the formula

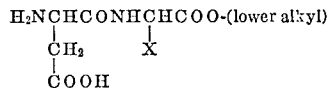

wherein X is selected from the group of radicals consisting of

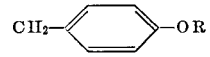

and

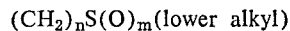

R being a member of the group consisting of hydrogen and a lower alkyl radical $m$ an integer selected from the group consisting of 0 and 2 and $n$ a positive integer less than three.

2. As in claim 1, an aspartyl dipeptide lower alkyl ester of the formula

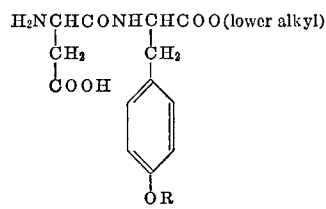

wherein R is selected from the group consisting of hydrogen and a lower alkyl radical.

3. As in claim 1, an aspartyl dipeptide methyl ester of the formula

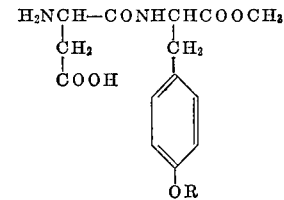

wherein R is selected from the group consisting of hydrogen and a lower alkyl radical.

4. As in claim 1, an aspartyl dipeptide lower alkyl ester of the formula

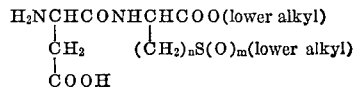

wherein $m$ is an integer selected from the group consisting of 0 and 2 and $n$ is a positive integer less than 3.

5. As in claim 1, the compound which is L-aspartyl-L-tyrosine methyl ester.

6. As in claim 1, the compound which is L-aspartyl-L-tyrosine ethyl ester.

7. As in claim 1, the compound which is L-aspartyl-L-O-methyltyrosine methyl ester.

8. As in claim 1, the compound which is L-aspartyl-L-O-ethyltyrosine methyl ester.

9. As in claim 1, the compound which is L-aspartyl-L-methionine methyl ester.

10. As in claim 1, the compound which is L-aspartyl-L-S-methylcysteine methyl ester.

11. As in claim 1, the compound which is L-aspartyl-L-methionine sulfone methyl ester.

12. As in claim 1, the compound which is L-aspartyl-L-S-methylcysteine sulfone methyl ester.

References Cited

UNITED STATES PATENTS 2,723,972  11/1955  Herrick et al. _____ 260—112.5
3,243,423  3/1966   Beyerman _____ 260—112.5

OTHER REFERENCES

Buchanan et al., Biochem. 5, 3244 (1966).
Dekker et al., J. Biol. Chem. 180, 168–169 (1949).
Fruton et al., J. Biol. Chem. 127, 635–638 (1939).
Hanson et al., J. Chem. Soc. 1964, 836–839.
Le Quesne et al., J. Chem. Soc. 1952, 26–27.
Touze-Soulet et al., Compte Rendus Acad. Sci. Fr. 252, 353–355 (1961).
Zacharius et al., Arch. Biochim. Biophys. 80, 207 (1959).

LEWIS GOTTS, Primary Examiner

MELVYN M. KASSENOFF, Assistant Examiner

U.S. Cl. X.R.

99—79, 140, 141